US011122808B2

(12) United States Patent
Rodriguez et al.

(10) Patent No.: US 11,122,808 B2
(45) Date of Patent: Sep. 21, 2021

(54) METHODS AND COMPOSITIONS FOR ILLUMINATING AND CHARACTERIZING MICROBIAL AND PLANT INTERACTIONS, NUTRIENT UPTAKE, CHEMICAL AND PETROLEUM DEGRADATION, SEED AND FERTILIZER QUALITY CONTROL AND DIAGNOSITCS ON AGRICULTURE APPLICATIONS

(71) Applicant: New Life Biosciences, LLC, Conroe, TX (US)

(72) Inventors: Marc J. Rodriguez, Conroe, TX (US); James S. Stansell, Conroe, TX (US); Joseph P. Schneider, Conroe, TX (US)

(73) Assignee: NEW LIFE BIOSCIENCES, LLC, Conroe, TX (US)

( * ) Notice: Subject to any disclaimer, the term of this patent is extended or adjusted under 35 U.S.C. 154(b) by 71 days.

(21) Appl. No.: 15/981,206

(22) Filed: May 16, 2018

(65) Prior Publication Data

US 2018/0332856 A1   Nov. 22, 2018

Related U.S. Application Data

(60) Provisional application No. 62/506,717, filed on May 16, 2017.

(51) Int. Cl.
| | | |
|---|---|---|
| *A01N 63/30* | (2020.01) | |
| *A01N 63/00* | (2020.01) | |
| *A01N 25/00* | (2006.01) | |
| *A01N 63/20* | (2020.01) | |
| *A01N 65/03* | (2009.01) | |

(52) U.S. Cl.
CPC ............ *A01N 63/30* (2020.01); *A01N 25/00* (2013.01); *A01N 63/00* (2013.01); *A01N 63/20* (2020.01); *A01N 65/03* (2013.01)

(58) Field of Classification Search
CPC ...................................................... A01N 63/00
See application file for complete search history.

(56) References Cited

U.S. PATENT DOCUMENTS 6,107,544 A    8/2000   Ryals et al.

OTHER PUBLICATIONS

Whiteside, Matthew D., et al., The brighter side of soils: Quantum dots track organic nitrogen through fungi and plants, Ecological Society of America, pp. 100-108, 2009.
Geva-Zatorsky, Naama, et al., In vivo imaging and tracking of host-microbiota interactions via metabolic labeling of gut anaerobic bacteria, Nat Med., 21(9), 1091-1100, Mar. 1, 2016.
Wang, Keri, et al., Monitoring in planta bacterial infection at both cellular and whole-plant levels using the green fluorescent protein variant GFPuv, New Phytologist, 174: 212-223, Nov. 25, 2006.
Aldon, Didier, et al., A bacterial sensor of plant cell contact controls the transcriptional induction of Ralstonia solanacearum pathogenicity genes, The EMBO Journal, vol. 19. No. 10 pp. 2304-2314, 2000.
Johnson, Anders R., et al., Evaluation of Fluorescently Labeled Lectins for Noninvasive Localization of Extracellular Polymeric Substances in Sphingomonas Biofilms, Applied and Environmental Microbiology, vol. 66, No. 3, pp. 3487-3491, Aug. 2000.

*Primary Examiner* — Heidi Reese
(74) *Attorney, Agent, or Firm* — McKee, Voorhees & Sease, PLC

(57) ABSTRACT

The present invention relates to methods and compositions for illuminating, characterizing and demonstrating the uses for microbial and plant interactions, plant nutrient uptake, environmental chemical degradation, petroleum degradation, quality control for seed treatment and fertilizer blends and diagnostics on agricultural applications.

11 Claims, 1 Drawing Sheet

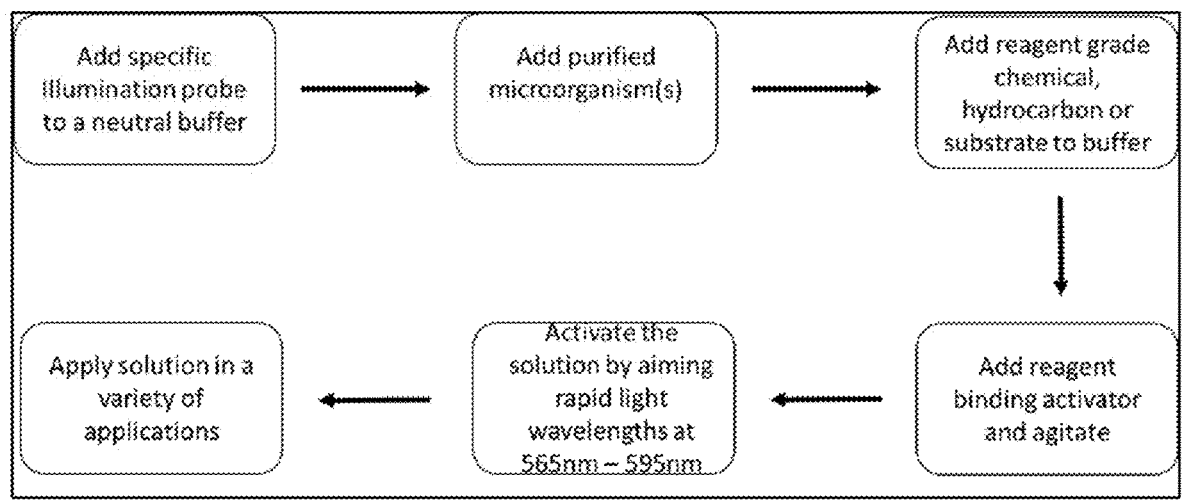

METHODS AND COMPOSITIONS FOR ILLUMINATING AND CHARACTERIZING MICROBIAL AND PLANT INTERACTIONS, NUTRIENT UPTAKE, CHEMICAL AND PETROLEUM DEGRADATION, SEED AND FERTILIZER QUALITY CONTROL AND DIAGNOSITCS ON AGRICULTURE APPLICATIONS

CROSS REFERENCE TO RELATED APPLICATION

This application claims priority under 35 U.S.C. § 119 to provisional application Ser. No. 62/506,717 filed May 16, 2017, herein incorporated by reference in its entirety.

FIELD OF THE TECHNOLOGY

The present disclosure relates generally to methods and compositions utilizing illumination probes. In particular, the present disclosure relates to methods of using and producing illumination probes for efficacy in a variety of applications including characterizing and demonstrating the uses for microbial and plant interactions, plant nutrient uptake, environmental chemical degradation, petroleum degradation, quality control for seed treatment and fertilizer blends and diagnostics on agriculture applications. The methods and compositions described in this disclosure are also applicable to domestic applications such as pest control, home and garden, road and rail way, turf, green house and ornamental uses.

BACKGROUND OF THE TECHNOLOGY

The ability to track microbes and substrates in real time in vivo is of enormous value for many applications. Bioluminescent imaging represents a powerful tool for use with both microbes and substrates conjugated to luminescent probes. Tracking and quantification of microorganisms and/or biomolecule substrates has the potential to provide invaluable information for optimizing unique biological and chemical systems.

Traditionally, assays like western blotting, polymerase chain reaction, enzyme-linked immunoassays, nuclear magnetic resonance spectroscopy, high-performance liquid chromatography, and the like have been utilized to provide analytics. However, due to the constraints of each technique real-time detection, in vivo, is virtually impossible. Further, the cost to run and maintain equipment, reagents and training individuals to these assays represent a burden for their use in day to day operations for most industries. For example, currently there is very little technology that is able to illuminate plant root, bacteria and nutrient interactions. Antipathogenic activity is conventionally measured by a decrease in pathogen biomass. For example, a susceptible plant is challenged with a pathogen of interest. Over time, tissue samples from the pathogen-inoculated plant tissues are obtained and RNA is extracted. The percent of a specific pathogen RNA transcript relative to the level of a plant specific transcript allows the level of pathogen biomass to be determined. See, for example, Thomma et al. (1998) Plant Biology 95:15107-15111.

In contrast, the present disclosure provides methods and compositions for real-time, in vivo, tracking and quantification of microbes and/or substrates in a variety of industries. The present disclosure allows for illuminating and characterizing, for example, microbial interactions, nutrient uptake, plant and pest interactions, plant growth and development, life stock monitoring and diagnostics. Therefore, it is a primary object, feature, or advantage of the present disclosure to improve upon the state of the art.

BRIEF SUMMARY OF PREFERRED EMBODIMENTS

The present disclosure provides methods and compositions for illuminating substrate and microbial targets providing in vivo and in situ analytics. In one aspect, the disclosure provides the blending of illumination probes with bacteria and/or fungi. The microbial-luminescent probes can then be utilized in a variety of applications, including, for example, for the purpose of illumination of microorganisms, plant nutrient synergy and activity.

In another aspect of the disclosure, luminescent-conjugated microorganisms are added to agriculture amendments such as such as adjuvants, bio stimulants, biofertilizers, fertilizers (organic and inorganic), surfactants, seeds, seed treatments, liquid and dry soil amendments, plant growth regulators and any plant growth genomic or proteomic inductive or repressive system.

In one embodiment, the addition of luminescent-conjugated microorganisms is to the soil rhizosphere portion, foliar portion and/or seed portion of the plant. The addition of luminescent-conjugated microorganisms to plant seeds, plant roots and the plant foliar portions, are utilized, for example, for bio-control and illumination of pathogenic nematodes and fungal pathogens.

In another aspect of the disclosure, the addition and use of fluorescent illuminating materials is for diagnostic purposes in agriculture for applications, on or off-target, insect control and diagnostics, disease control and diagnostics, weed control diagnostics.

In another aspect of the disclosure, the addition of luminescent-conjugated microorganisms is to hydrocarbons of all chain lengths and molecular weights. As used herein, hydrocarbons encompass all alkanes from the saturates, aliphatic, resinoids and asphaltenes spectrum.

In one embodiment of the disclosure, the use fluorescent illuminating materials is for animal health applications, life stock monitoring and diagnostics, hoof applications and diagnostics.

In one aspect, the methods and compositions of the present disclosure are utilized in domestic and or non-agriculture based industries. For example, in pest control and/or protection products. Such applications include but are not limited to pest control, home and garden, road and rail way, turf, green house and ornamental applications.

In another aspect, the methods and compositions of the present disclosure are utilized as read out for calibrating equipment.

BRIEF DESCRIPTION OF THE FIGURE

The following FIGURE forms part of the specification and is included to further demonstrate a preferred embodiment. In some instances, the preferred embodiment can be best understood by referring to the accompanying FIGURE in combination with the detailed description presented herein. The description and accompanying FIGURE may highlight a certain specific example or a preferred embodiment. However, one skilled in the art will understand that portions of the example or aspect may be used in combination with other examples or aspects of the disclosure.

The FIGURE shows a flow chart describing a preferred embodiment of a method described herein.

DETAILED DESCRIPTION OF A PREFERRED EMBODIMENT

The following introductory matters and definitions are provided to facilitate an understanding of the present disclosure.

The present disclosure provides methods and compositions for illuminating substrate and microbial targets providing in vivo and in situ analytics. The disclosure provides for the blending of illumination probes with a microorganism and/or a substrate of interest, conjugating the illumination probe to the microorganism and/or a substrate with a binding activator, allowing the solution to mix for a sufficient amount of time, and activating the solution by exposure to light.

Methods can include conjugation of illumination probes wherein specific reagent grade bioluminescent probes are added to a buffer solution, such as borate buffer, in a pH range from about 6.4 pH to about 8.4 pH. In a preferred embodiment, the buffer is at 7.4 pH. Purified microbes and/or reagent grade chemical, hydrocarbon or substrate are added to the buffer containing the illumination probe and the blend is agitated.

A binding activator, such as 1-Ethylene-3-(3-dimethylaminopropyl) carbodi-imide hydrochloride (EDC) is added to the solution and agitated for a sufficient time to allow conjugation. Next, the solution is activated by exposure to light wavelengths from about at 500 nm to about 600 nm. The solution can then be added to a number of applications where both microbial and substrate illumination will be confirmed and validated.

The methods described herein can be utilized in a variety of applications, including, for example, agricultural applications, animal health applications, aquaculture applications, hydrocarbon applications, and calibrating application equipment.

Numeric ranges recited within the specification are inclusive of the numbers defining the range and include each integer within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range. Further, numeric ranges recited within the specification, including ranges of "greater than," "at least," or "less than" a numeric value, are inclusive of the numbers defining the range and include each integer within the defined range.

The singular terms "a", "an", and "the" include plural referents unless context clearly indicates otherwise. Similarly, the word "or" is intended to include "and" unless the context clearly indicate otherwise. The word "or" means any one member of a particular list and also includes any combination of members of that list.

The term "about," as used herein, refers to variation in the numerical quantity that can occur, for example, through typical measuring techniques and equipment, with respect to any quantifiable variable, including, but not limited to, mass, volume, time, pH, and wave length. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

Units, prefixes, and symbols may be denoted in their SI accepted form. Unless otherwise indicated, nucleic acids are written left to right in 5' to 3' orientation; amino acid sequences are written left to right in amino to carboxy orientation, respectively. Numeric ranges are inclusive of the numbers defining the range and include each integer within the defined range. Amino acids may be referred to herein by either their commonly known three letter symbols or by the one-letter symbols recommended by the IUPAC-IUB Biochemical nomenclature Commission. Nucleotides, likewise, may be referred to by their commonly accepted single-letter codes. Unless otherwise provided for, software, electrical, and electronics terms as used herein are as defined in The New IEEE Standard Dictionary of Electrical and Electronics Terms (5th edition, 1993). The terms defined below are more fully defined by reference to the specification as a whole.

"Pathogen resistance", "disease resistance" is intended to mean that the plant avoids the disease symptoms that are the outcome of plant-pathogen interactions. That is, pathogens are prevented from causing plant diseases and the associated disease symptoms, or alternatively, the disease symptoms caused by the pathogen are minimized or lessened, such as, for example, the reduction of stress and associated yield loss.

Assays that measure antipathogenic activity are commonly known in the art, as are methods to quantitate disease resistance in plants following pathogen infection. See, for example, U.S. Pat. No. 5,614,395, herein incorporated by reference. Such techniques include, measuring over time, the average lesion diameter, the pathogen biomass, and the overall percentage of decayed plant tissues. For example, a plant treated under certain conditions show a decrease in tissue necrosis (i.e., lesion diameter) or a decrease in plant death following pathogen challenge when compared to a control plant that was not treated. In one embodiment, illuminated-microbes according to the present disclosure are used to determine pathogen and/or disease resistance.

As used herein, the term "plant" can include reference to whole plants, plant parts or organs (e.g., leaves, stems, roots, etc.), plant cells, seeds and progeny of same. Plant cell, as used herein, further includes, without limitation, cells obtained from or found in: seeds, suspension cultures, embryos, meristematic regions, callus tissue, leaves, roots, shoots, gametophytes, sporophytes, pollen, and microspores. Plant cells can also be understood to include modified cells, such as protoplasts, obtained from the aforementioned tissues. The class of plants which can be used in the methods of the disclosure is generally as broad as the class of higher plants amenable to transformation techniques, including both monocotyledonous and dicotyledonous plants. Particularly preferred plants include those utilized in crop systems, for example, maize, soybean, sunflower, sorghum, canola, wheat, alfalfa, cotton, rice, barley, millet, and the like.

As used herein "microorganisms" include bacteria, protozoa, algae, or fungi, or a combination thereof.

As used herein "illumination probes" can consist of artificial or naturally occurring fluorescence, iridescence, noble gases and any wavelength excitation material. In a preferred embodiment the illumination probe is a quantum dot.

A variety of surfactants can be used within the methods of the disclosure, such as anionic, nonionic, cationic, and zwitterionic surfactants.

By "amplified" is meant the construction of multiple copies of a nucleic acid sequence or multiple copies complementary to the nucleic acid sequence using at least one of the nucleic acid sequences as a template. Amplification systems include the polymerase chain reaction (PCR) system, ligase chain reaction (LCR) system, nucleic acid sequence based amplification (NASBA, Cangene, Mississauga, Ontario), Q-Beta Replicase systems, transcription-based amplification system (TAS), and strand displacement amplification (SDA). See, e.g., Diagnostic Molecular Microbiology: Principles and Applications, Persing, et al., eds., American Society for Microbiology, Washington, D.C. (1993). The product of amplification is termed an amplicon.

By "encoding" or "encoded," with respect to a specified nucleic acid, is meant comprising the information for translation into the specified protein. A nucleic acid encoding a protein may comprise non-translated sequences (e.g., introns) within translated regions of the nucleic acid, or may lack such intervening non-translated sequences (e.g., as in cDNA). The information by which a protein is encoded is specified by the use of codons. Typically, the amino acid sequence is encoded by the nucleic acid using the "universal" genetic code. However, variants of the universal code, such as is present in some plant, animal, and fungal mitochondria, the bacterium *Mycoplasma* capricolum (Yamao, et al., (1985) Proc. Natl. Acad. Sci. USA 82:2306-9), or the ciliate Macronucleus, may be used when the nucleic acid is expressed using these organisms.

As used herein, "nucleic acid" includes reference to a deoxyribonucleotide or ribonucleotide polymer in either single- or double-stranded form, and unless otherwise limited, encompasses known analogues having the essential nature of natural nucleotides in that they hybridize to single-stranded nucleic acids in a manner similar to naturally occurring nucleotides (e.g., peptide nucleic acids).

When the nucleic acid is prepared, or altered synthetically, advantage can be taken of known codon preferences of the intended host where the nucleic acid is to be expressed. For example, although nucleic acid sequences of the present disclosure may be expressed in both monocotyledonous and dicotyledonous plant species, sequences can be modified to account for the specific codon preferences and GC content preferences of monocotyledonous plants or dicotyledonous plants as these preferences have been shown to differ (Murray, et al., (1989) Nucleic Acids Res. 17:477-98 and herein incorporated by reference). Thus, the maize preferred codon for a particular amino acid might be derived from known gene sequences from maize.

As used herein, "gene" refers to chromosomal DNA, plasmid DNA, cDNA, synthetic DNA, or other DNA that encodes a peptide, polypeptide, protein, or RNA molecule, and regions flanking the coding sequences involved in the regulation of expression.

As used herein, "polynucleotide" includes reference to a deoxyribopolynucleotide, ribopolynucleotide, or analogs thereof that have the essential nature of a natural ribonucleotide in that they hybridize, under stringent hybridization conditions, to substantially the same nucleotide sequence as naturally occurring nucleotides and/or allow translation into the same amino acid(s) as the naturally occurring nucleotide(s). A polynucleotide can be full-length or a subsequence of a native or heterologous structural or regulatory gene. Unless otherwise indicated, the term includes reference to the specified sequence as well as the complementary sequence thereof. Thus, DNAs or RNAs with backbones modified for stability or for other reasons are "polynucleotides" as that term is intended herein. Moreover, DNAs or RNAs comprising unusual bases, such as inosine, or modified bases, such as tritiated bases, to name just two examples, are polynucleotides as the term is used herein. It will be appreciated that a great variety of modifications have been made to DNA and RNA that serve many useful purposes known to those of skill in the art. The term polynucleotide as it is employed herein embraces such chemically, enzymatically or metabolically modified forms of polynucleotides, as well as the chemical forms of DNA and RNA characteristic of viruses and cells, including inter alia, simple and complex cells.

The terms "polypeptide," "peptide," and "protein" are used interchangeably herein to refer to a polymer of amino acid residues. The terms apply to amino acid polymers in which one or more amino acid residue is an artificial chemical analogue of a corresponding naturally occurring amino acid, as well as to naturally occurring amino acid polymers.

The terms "residue" or "amino acid residue" or "amino acid" are used interchangeably herein to refer to an amino acid that is incorporated into a protein, polypeptide, or peptide (collectively "protein"). The amino acid may be a naturally occurring amino acid and, unless otherwise limited, may encompass known analogs of natural amino acids that can function in a similar manner as naturally occurring amino acids.

A "polymer" as used herein refers to a macromolecular organic compound that is largely, but not necessarily exclusively, formed of repeating units covalently bonded in a chain, which may be linear or branched. A "repeating unit" is a structural moiety of the macromolecule which is found more than once within the macromolecular structure. Typically, a polymer is composed of a large number of only a few types of repeating units that are joined together by covalent chemical bonds to form a linear backbone, from which substituents may or may not depend in a branching manner. The repeating units can be identical to each other but are not necessarily so. Therefore a structure of the type -A-A-A-A- wherein A is a repeating unit is a polymer, also known as a homopolymer, and a structure of the type -A-B-A-B- or -A-A-A-B-A-A-A-B- wherein A and B are repeating units, is also a polymer, and is sometimes termed a copolymer. A structure of the type -A-A-A-C-A-A-A or A-B-A-C-A-B-A wherein A and B are repeating units but C is not a repeating unit (i.e., C is only found once within the macromolecular structure) is also a polymer under the definition herein. When C is flanked on both sides by repeating units, C is referred to as a "core" or a "core unit." A short polymer, formed of up to about 10 repeating units, is referred to as an "oligomer." There is theoretically no upper limit to the number of repeating units in a polymer, but practically speaking the upper limit for the number of repeating units in a single polymer molecule may be approximately one million. However, the polymers described in the herein are not limited by the number of repeating units, which can often be in the hundreds.

A "copolymer" is a variety of polymer wherein non-identical repeating units are present. A copolymer may be regular or random in the sequence defined by the more than one type of repeating unit. Some types of copolymers are random copolymers, graft copolymers and block copolymers.

In one embodiment, the methods of the present invention as described herein can be used to determine an improvement in a determined trait or a plant or animal. As used herein, "improved trait" refers to a trait with a detectable improvement in a plant or animal relative to a control plant/animal or a reference. In some cases, the trait improvement can be measured quantitatively. For example, the trait improvement can entail at least a 2% desirable difference in an observed trait, at least a 5% desirable difference, at least about a 10% desirable difference, at least about a 20% desirable difference, at least about a 30% desirable difference, at least about a 50% desirable difference, at least about a 70% desirable difference, or at least about a 100% difference, or an even greater desirable difference. In other cases, the trait improvement is only measured qualitatively. It is known that there can be a natural variation in a trait. Trait improvement includes, but not limited to, improved health and immunity, yield increase, including increased yield under non-stress conditions and increased yield under environmental stress conditions. In the example of a plant, stress conditions may include, for example, drought, shade, fungal disease, viral disease, bacterial disease, insect infestation, nematode infestation, cold temperature exposure, heat exposure, osmotic stress, reduced nitrogen nutrient availability, reduced phosphorus nutrient availability and high plant density.

Many agronomic traits can affect "yield", including without limitation, plant height, pod number, pod position on the plant, number of internodes, incidence of pod shatter, grain size, efficiency of nodulation and nitrogen fixation, efficiency of nutrient assimilation, resistance to biotic and abiotic stress, carbon assimilation, plant architecture, resistance to lodging, percent seed germination, seedling vigor, and juvenile traits. Other traits that can affect yield include, efficiency of germination (including germination in stressed conditions), growth rate (including growth rate in stressed conditions), ear number, seed number per ear, seed size, composition of seed (starch, oil, protein) and characteristics of seed fill. Also of interest is the generation of transgenic plants that demonstrate desirable phenotypic properties that may or may not confer an increase in overall plant yield. Such properties include enhanced plant morphology, plant physiology or improved components of the mature seed.

Herbicides for which can be used according to the disclosure include, but are not limited to, glyphosate, dicamba, glufosinate, sulfonylurea, bromoxynil and norflurazon herbicides.

A fertilizer which can be used within the present disclosure is any material of natural or synthetic origin (other than liming materials) that is applied to soils or to plant tissues to supply one or more plant nutrients essential to the growth of plants.

In one aspect, the present disclosure involves illumination-probes for agricultural substrates. Exemplary agriculture substrates are, but are not limited to, water, liquid and dry fertilizers, herbicides, pesticides, surfactants, adjuvants, soil amendments, micronutrients.

In another aspect, the present disclosure involves illumination-probes for animal health substrates. Exemplary animal health substrates are, but are not limited to, corn soy grains, calcium and limestone, molasses, sugars, vitamins, and water.

In another aspect, the present disclosure involves illumination-probes for petroleum substrates. Exemplary petroleum substrates are, but are not limited to, saturates, aromatics, resinoids, asphaltenes and natural gas condensate.

In another aspect, the present disclosure involves illumination-probes for aquaculture substrates. Exemplary aquaculture substrates are, but are not limited to, water, sludge, residue wastewater, processing effluent and waste.

In another aspect of the disclosure, the methods and compositions of the present disclosure are used in non-agricultural applications. For instance, illumination probes may be conjugated to substrates and utilized as a read out to determine sufficient application of the conjugated substrate. To this point, in an exemplary embodiment, illumination probes are conjugated to polymers used in paint and powder coating sprays allowing for the visualization and determination of proper coating and spraying. Furthermore, illumination probe conjugated substrates may be beneficially used to calibrate application equipment.

For example, during treatment of seed or grain in a storage bin, illumination probe conjugated substrates may be applied to make a determination of how efficient the product is being coated.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

EXAMPLES

Embodiments of the present disclosure are further defined in the following non-limiting Examples. It should be understood that these Examples, while indicating certain embodiments of the disclosure, are given by way of illustration only. From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims.

Example 1: Agriculture Applications

Conjugation of Bioluminescent Probes Through Light and Dark Reactions
1. Add specific reagent grade bioluminescent probes to 500 ml of Borate buffer at 7.4 pH
2. Add filter purified bacteria at concentration of $1.0 \times 10^6$ CFU/ml to buffer
3. Add reagent grade chemical, hydrocarbon or substrate to buffer at 500 microliters and agitate
4. Add reagent binding activator 1-Ethylene-3-(3-dimethylaminopropyl) carbodi-imide hydrochloride (EDC) at a concentration of 10 microliters to the solution and agitate
5. Agitate for 6 hours and 32° C. in the dark without any light or wave interference 6. After 6 hours of platform shaking and incubation, activate the solution by aiming light wavelengths at 565 nm into the solution for 30 seconds.
7. Add 25 ml of solution to a 500 g small pot with a growing seed for nutrient and probe uptake confirmation and analysis
8. Both microbial and substrate illumination will confirm and validate microbial-nutrient mineralization, microbial-plant synergy and efficacy responses by herbicides, pesticides, fungicides, adjuvants, micro and macro nutrients, surfactants and growth promotion products for nutrient uptake and nutrient fate analysis.

Example 2: Animal Health Applications

Conjugation of Bioluminescent Probes Through Light and Dark Reactions
1. Add specific reagent grade bioluminescent probes to 500 ml of Borate buffer at 7.4 pH
2. Add filter purified bacteria at concentration of $1.0 \times 10^6$ CFU/ml to buffer
3. Add reagent grade chemical, hydrocarbon or substrate to buffer at 500 microliters and agitate
4. Add reagent binding activator 1-Ethylene-3-(3-dimethylaminopropyl) carbodi-imide hydrochloride (EDC) at a concentration of 10 microliters to the solution and agitate
5. Agitate for 6 hours and 32° C. in the dark without any light or interference
6. After 6 hours of platform shaking and incubation, activate the solution by aiming light wavelengths at 565 nm into the solution for 30 seconds.
7. Add 25 gm of solution to the standard diet of livestock animals for ingestion and gut cell analysis

TABLE 1

| Livestock Probe Assay | | | | |
| --- | --- | --- | --- | --- |
| Treatment | Dosage* | Application Frequency | Dogs | Duration |
| C(a) Untreated Control | Standard diet only | As Recommended | 40 | 45 days |
| T Treatment | Standard Diet + 3 grams probe blend | As Recommended | 40 | 45 days |

Trial Duration: 3 days

After 3 days, take a sample of the gut lining to determine exposure to the lumen cells. The location of the bioluminescent probe (565 nm-595 nm) will determine efficacy and locality of the bound substrate within the animal digestive system.

Example 3: Hydrocarbon Applications (Petroleum, Herbicide, Insecticides, Etc—i.e., any Chemical or Compound with a Hydrocarbon Backbone)

1. Add specific reagent grade bioluminescent probes to 500 ml of Borate buffer at 7.4 pH
2. Add filter purified bacteria at concentration of $1.0 \times 10^6$ CFU/ml to buffer
3. Add reagent grade chemical, hydrocarbon or substrate to buffer at 500 microliters and agitate
4. Add reagent binding activator 1-Ethylene-3-(3-dimethylaminopropyl) carbodi-imide hydrochloride (EDC) at a concentration of 10 microliters to the solution and agitate
5. Agitate for 6 hours and 32° C. in the dark without any light or wave interference
6. After 6 hours of platform shaking and incubation, activate the solution by aiming rapid light wavelengths at 565 nm-595 nm into the solution for 30 seconds.
7. Add 25 ml of solution to a 500 g solution containing a hydrocarbon backbone on a shaking platform or hybridization oven for probe uptake analysis and confirmation.

The above specification provides a description of the manufacture and use of the disclosed compositions and methods. Since many embodiments can be made without departing from the spirit and scope of the disclosure, the invention resides in the claims.

What is claimed is:

1. A method of validating microbial-nutrient mineralization or microbial-plant synergy, the method comprising:
   blending a luminescent probe with a bacteria and a plant micronutrient or macronutrient into a solution;
   conjugating the luminescent probe to the bacteria with a binding activator;
   activating the solution by exposure to light within the range of about 500 nm to about 600 nm;
   applying the activated solution to the rhizosphere of a plant; and
   tracking or quantifying the luminescent-conjugated bacteria, thereby validating microbial-nutrient mineralization or microbial-plant synergy.

2. The method of claim 1, wherein said binding activator is 1-Ethylene-3-(3-dimethylaminopropyl) carbodi-imide hydrochloride.

3. The method of claim 1, wherein the solution is in a pH range of about 7 pH to about 8 pH.

4. The method of claim 1, wherein a luminescent probe is also conjugated to the plant micronutrient or macronutrient.

5. A method of tracking or quantifying plant root, rhizosphere bacteria, and nutrient interactions, the method comprising:
   blending a luminescent probe with the bacteria and the plant micronutrient or macronutrient into a solution;
   conjugating the luminescent probe to the bacteria with a binding activator;
   activating the solution by exposure to light within the range of about 500 nm to about 600 nm;
   applying said activated solution to the rhizosphere of a plant; and
   tracking or quantifying the luminescent-conjugated bacteria.

6. The method of claim 5, wherein a luminescent probe is also conjugated to the plant micronutrient or macronutrient.

7. The method of claim 1, wherein the conjugating comprises agitating the solution in the dark at 32° C. for 6 hours.

8. The method of claim 1, wherein the exposure to light is at a wavelength of 565 nm.

9. The method of claim 1, wherein the solution comprises a borate buffer.

10. The method of claim 3, wherein the solution is at a pH of 7.4.

11. The method of claim 1, wherein the luminescent probe is a quantum dot.

* * * * *